(12) United States Patent
Bajema (10) Patent No.: US 7,461,501 B1
(45) Date of Patent: Dec. 9, 2008

(54) CHAIN ASSEMBLY

(76) Inventor: Curtis B. Bajema, 3409 85th Dr. SE., Everett, WA (US) 98205

( * ) Notice: Subject to any disclaimer, the term of this patent is extended or adjusted under 35 U.S.C. 154(b) by 0 days.

(21) Appl. No.: 11/957,097

(22) Filed: Dec. 14, 2007

(51) Int. Cl.
*F16G 15/00* (2006.01)
(52) U.S. Cl. .................................. 59/93; 59/78; 59/83
(58) Field of Classification Search ............ 59/78, 59/78.1, 83, 93; 411/530
See application file for complete search history.

(56) References Cited

U.S. PATENT DOCUMENTS

| | | | |
|---|---|---|---|
| 847,228 A | 3/1907 | Bixby | |
| 1,772,930 A * | 8/1930 | Olier, Jr. ...................... | 59/78.1 |
| 2,110,226 A | 3/1938 | Hill | |
| 2,870,079 A * | 1/1959 | McCall .................... | 204/196.2 |
| 3,264,821 A | 8/1966 | Rosenberg | |
| 3,635,813 A * | 1/1972 | Drisko et al. ............. | 204/196.2 |
| 3,973,389 A | 8/1976 | Roberts | |
| 6,805,471 B2 | 10/2004 | Strelnieks | |
| 7,306,275 B2 * | 12/2007 | Kalous ...................... | 296/1.07 |

* cited by examiner

*Primary Examiner*—David B Jones
(74) *Attorney, Agent, or Firm*—Michael F. Hughes; Hughes Law Firm, PLLC (57) ABSTRACT

An assembly comprising a plurality of linked members configured to inter-operate with a cord member. The plurality of link members are interconnected such that the body of one link member passes through the inner surface defining a void of the other link member. In this way, each link member is connected to its adjacent neighbor. A load-bearing flexible cord member is configured to interoperate with the plurality of link members in such a way that a portion of the cord member passes through the inner surface defining a void of a least one of the link members. This provides an improved attachment method over existing chains, and individual cords.

23 Claims, 9 Drawing Sheets

CHAIN ASSEMBLY

BACKGROUND OF THE DISCLOSURE

1. Field of the Disclosure

This disclosure relates to a method and apparatus configured to secure items utilizing a cord and cable combination. As such, the cord element is the load varying element, and the cable element is utilized to secure secondary attachment points along the cord member to maintain the lateral position therein.

2. Background Art

Other forms of linkages in connecting systems have been utilized such as U.S. Pat. No. 3,264,821 (Thomas Rosenberg). This application shows a chain for lamps and the like where the chain member has a wire woven therebetween. This patent shows a design of an electrical wire member being woven through a chain for providing current to a light hanging therebelow wherein the chain provides the structural support.

SUMMARY OF THE DISCLOSURE

In the field of securing elements, both cord members such as cables and chain members are well known in the art and those skilled in the art are well-versed in their application. What is disclosed is a combination cord member and chain element wherein the cord member is the load-bearing member. Prior art references such as the '821 reference by Thomas Rosenberg disclose the opposite application wherein the chain member is the load-bearing member and the cord member is a wire which is woven there-between to provide electrical current to the suspended light.

An assembly including a plurality of linked members configured to inter-operate with a cord member is hereby disclosed. The plurality of link members each include an outer perimeter and an inner surface defining a void which are interconnected such that the body of one link member passes through the inner surface defining a void of the other link member. In this way, each link member is connected to its adjacent neighbor. For ease of understanding, these link members are described as being oriented in either a vertical or a horizontal orientation such that the vertically oriented link members have a left side and a right side while the horizontally oriented link members have a top side and a bottom side. The load-bearing flexible cord member is configured to inter-operate with the plurality of link members in such a way that a portion of the cord member passes through the inner surface defining a void of at least one of the link members. In one form, the load-bearing flexible cord member passes from a first side to the second side of the link members and in so doing passes through the inner surface defining a void of each other link member and does not pass through the surface defining a void of the alternate link members.

In another embodiment of the disclosure, the cord member passes from the first side to the bottom side of every other horizontally oriented link member and passes from the bottom side to the top side of the alternate horizontally oriented link members through the inner surface defining a void of each horizontally oriented link member and does not pass through the surface defining a void of the vertically oriented link members. In yet another embodiment of the disclosure, the load-bearing flexible cord member passes from the right side to the left side of every other vertically oriented link member. The cord member then passes from the left side to the right side of the alternate vertically oriented link members and passes from the top side to the bottom side of every other horizontally oriented link member. From there, the cord member passes from the top side to the bottom side of the alternate horizontally oriented link members to the inner surface defining a void of each horizontally oriented link member.

In one form the flexible cord member is comprised of a metal cable. While many other embodiments are envisioned within the scope of the disclosure, such as ropes or plastic cables, etc., in one form the metal cable is at least partially covered by a protective polymer coating. This configuration is often found on sailboats and clotheslines. The protective polymer coating serves to protect users from coming into direct contact with the metal cable and also protects the metal cable from the elements. It may be desirable that the protective polymer coating is comprised of the same material as the material used to produce the link members.

A method for using this apparatus is also disclosed which includes several steps. First, providing a chain and flexible cord member combination where the flexible cord passes through several openings within the chain. The second step may include coupling a first end of a securing coupler to least one link of the chain. The third step may include coupling a second end of the securing coupler to a secure element, such as a tree, vehicle, post, or other item. These steps need not be followed in order, nor is this a compete list of the steps which may be taken in the use of the apparatus as disclosed.

Additionally, the chain used may be a polymer chain-link, as commonly found in decorative elements of landscaping.

DESCRIPTION OF THE PREFERRED EMBODIMENTS

For the sake of consistency, the same reference numeral will be used to denote the same element in all the figures and in the description. Furthermore, in order to avoid needlessly cluttering the drawings, certain elements have been purposely omitted. Some of these elements not shown are mentioned in the description or completely omitted if they are only of a very secondary nature with respect to the invention.

Using current technology there are at least two options to secure items. The first possible way to secure an item is to utilize a chain consisting of a plurality of linked members which would come in range of weights and strengths from a very light-weight, albeit weak, plastic chain as sometimes found as a decorative element in landscaping, to a heavy metal chain as commonly used to anchor boats, or secure other elements under heavy load. The second possible way to secure an item is by using a flexible member such as a rope, cable, strap, or cord. While these members are conceivably much lighter for their strength than a chain, any element tied along the length of such a member could potentially slide along the length of the member given a force in the longitudinal direction. What is disclosed as a combination assembly 20 wherein a load-bearing flexible cord member is provided in combination with a chain member to combine the advantages of each. The combination of these elements is greater than the sum of the parts, as will now be discussed.

Figure 6:
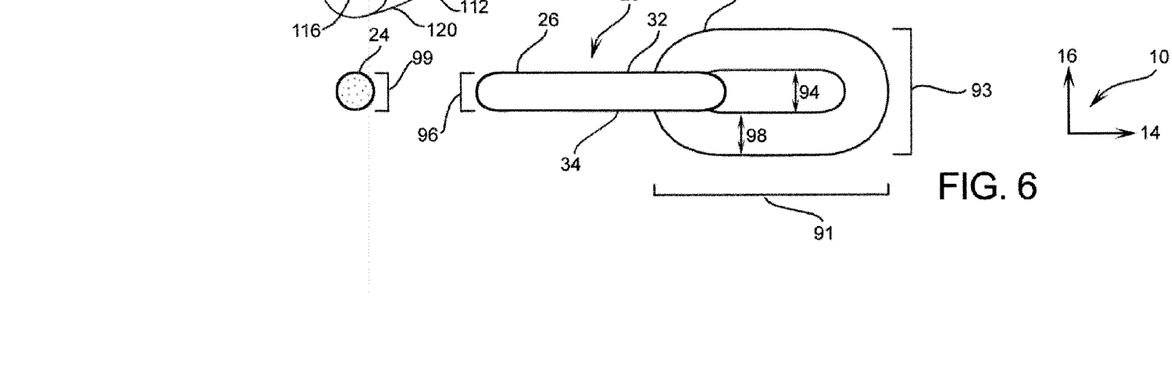
FIG. 6 is a detail view of a plurality of chain links showing the dimensions of the chain links.
Figure 7:
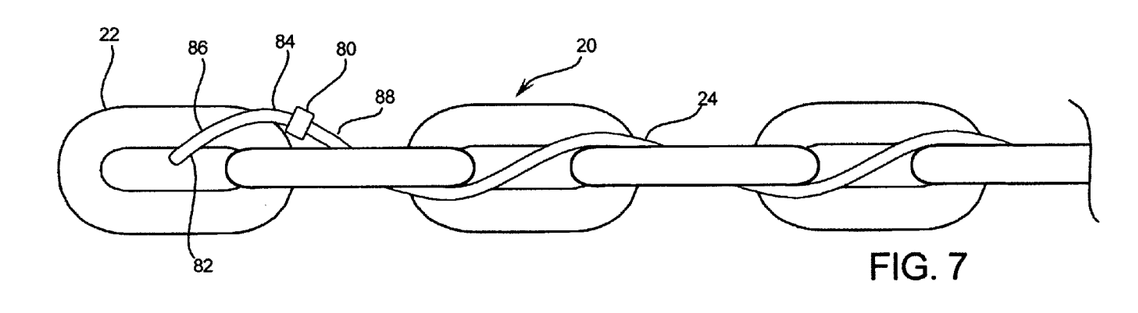
FIG. 7 is a side view of an embodiment of the disclosure including a crimp member.

Before going into a more detailed discussion, an axis system 10 is utilized (see FIG. 1) to help describe the drawings herein, with the axis indicated at 12 indicating a vertical axis and the arrow pointing in an upward direction. The axis indicated at 14 indicates a horizontal direction. As shown in FIG. 6, the axis at 16 indicates a transverse direction. Of course, the axes described below are for general reference purposes and locate directions for ease of description and general orientation of components described herein.

An optional embodiment of the disclosure focuses on two general elements: the first being a chain 22 formed of a plurality of links 23, the second being a load-bearing, flexible cord member 24. In general, the flexible cord member 24 passes through the chain 22 in such a way as to be movably coupled therewith. The assembly 20 can be used in an array of applications which are not supported by a flexible cord member independently. The disclosure will also be much lighter per unit of length as compared to a load-bearing chain member, as the chain 22 used in the disclosure may consist of a plastic chain or other light-weight material.

Figure 2:
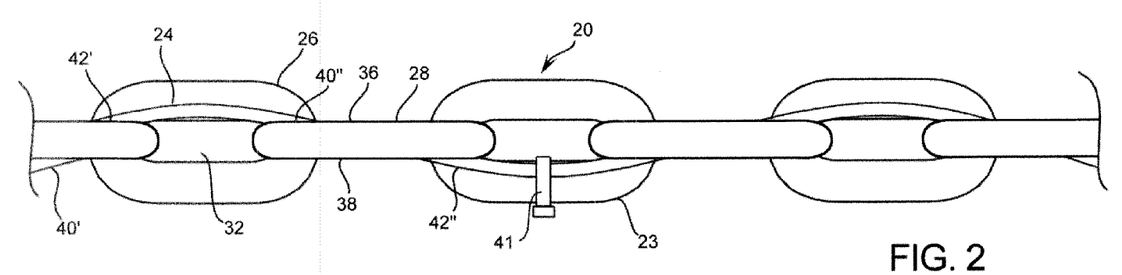
FIG. 2 is a side view of an embodiment of the disclosure showing a second woven configuration.

A first element of an embodiment of the disclosure is a light-weight chain. While each individual chain link is nearly identical, for ease of understanding the disclosure will be described having links of two different orientations as detailed in FIG. 2 and FIG. 6. The first is a first (vertical) orientation 26, oriented along the plane conforming to the vertical axis 12 and the second being a link 28 in a second (horizontal) orientation, in line with a plane conforming to the horizontal direction 14. Of course rotating the disclosure to a different orientation does not change the apparatus or its use. Looking at FIG. 6 it can be seen how the vertical chain-links 26 will have a right side 32 and a left side 34. While FIG. 2 shows how the horizontal chain-link 28 will have a top side 36 and a bottom side 38. As shown in FIG. 2, each link will further include an outer perimeter 30 circumscribing the link and an inner surface 32 which defines a void. Each vertical chain-link 26 will have at least one horizontal chain-link 28 associated therewith, wherein the body of the horizontal chain-link 28 will pass through the inner surface defining a void 31 of an associated vertical chain-link 26 thus coupling the two links together and in this way forming a chain 22 of links; the exception to this rule being the links 27 and 29 on either end of the chain, which will couple with only one link. Thus a terminus at either end of the chain 22 is formed.

A second element of an embodiment of the disclosure is a load-bearing flexible cord member 24. This cord member 24 can consist of a cable, rope, or any other flexible member having a diameter enabling it to pass through a link in the chain-link inner surface defining a void 31, and furthermore capable of supporting a load. A metal cable may be utilized. It may be advantageous to use a polymer coated cord member to protect the strands of the cord member from damage as a result of weather, animals, or other objects. This embodiment would also protect other objects from coming into direct contact with a steel portion of the cord member where a metal cable is utilized. While a single cable embodiment is shown in the figures, two or more cables may be utilized as well.

It may be beneficial in an embodiment of the disclosure to provide a chain link element composed of the same material as the polymer coating of the cord member. In this embodiment, this would help the cord member and the chain element stretch together.

The assembly 20 may also be formed of material that is very inexpensive for use as a disposable assembly. Naturally occurring materials may be used in forming the cord member and the chain member to make the assembly 20 biodegradable.

Figure 1:
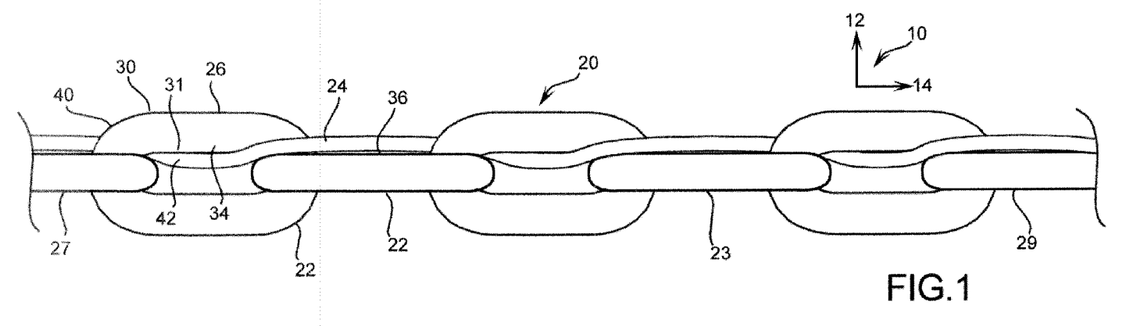
FIG. 1 is a side view of an embodiment of the disclosure showing a first woven configuration.

In one embodiment, shown in FIG. 1, it can be seen how the cord member 24 remains on the top side 36 of each horizontal chain-link 28 as it is woven in and out of the surface defining a void 31 of each vertical link 26. In this embodiment, the flexible cord member 24 passes from the right side 32 of the chain-link 26 at point 40, through the surface defining a void 31, and out on the left side 34 of the vertical link 26 at point 42. The cord member 24 passes this way through each and every vertical link 26.

FIG. 2 shows an embodiment of the disclosure wherein the flexible cord member 24 passes from the bottom side 38 of the horizontal chain link 28 at point 40', through the surface defining a void 31, and exits the top side 36 at point 42'. The flexible cord member 24 then passes along the left side 34 of the vertical chain-link 26, then passes from the top side 36 at point 40", through the surface defining a void 31, and exits on the lower side 38 of the horizontal chain-link 28 at point 42". The cord member 24 passes this way through every horizontal link 28.

Figure 3:
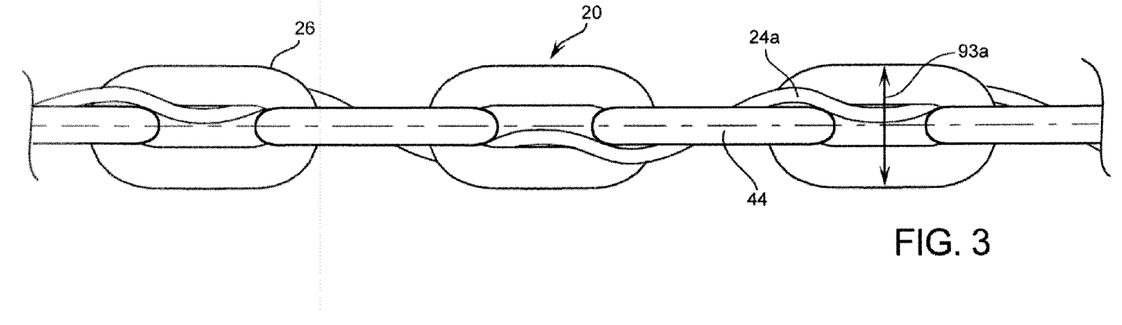
FIG. 3 is a side view of an embodiment of the disclosure showing a spiral configuration.

A third embodiment is disclosed and shown in FIG. 3 which is basically a combination of the two embodiments listed above. In this embodiment, the flexible cord member 24 passes through each and every chain-link. The flexible cord member 24 generally forms a spiral around the central axis 44 of the chain 22. This is accomplished by passing the flexible cord member 24 through each vertical chain-link 26 as shown in FIG. 1, and furthermore passing the flexible cord member 24 through each horizontal chain-link 28 in the same manner.

From these three examples it can be conceived of any number of alternate methods of movably coupling the flexible cord member 24 to the chain 22, such as a combination of the methods shown in FIG. 1 and FIG. 2, which operates to form a separate attachment method.

Figure 12:
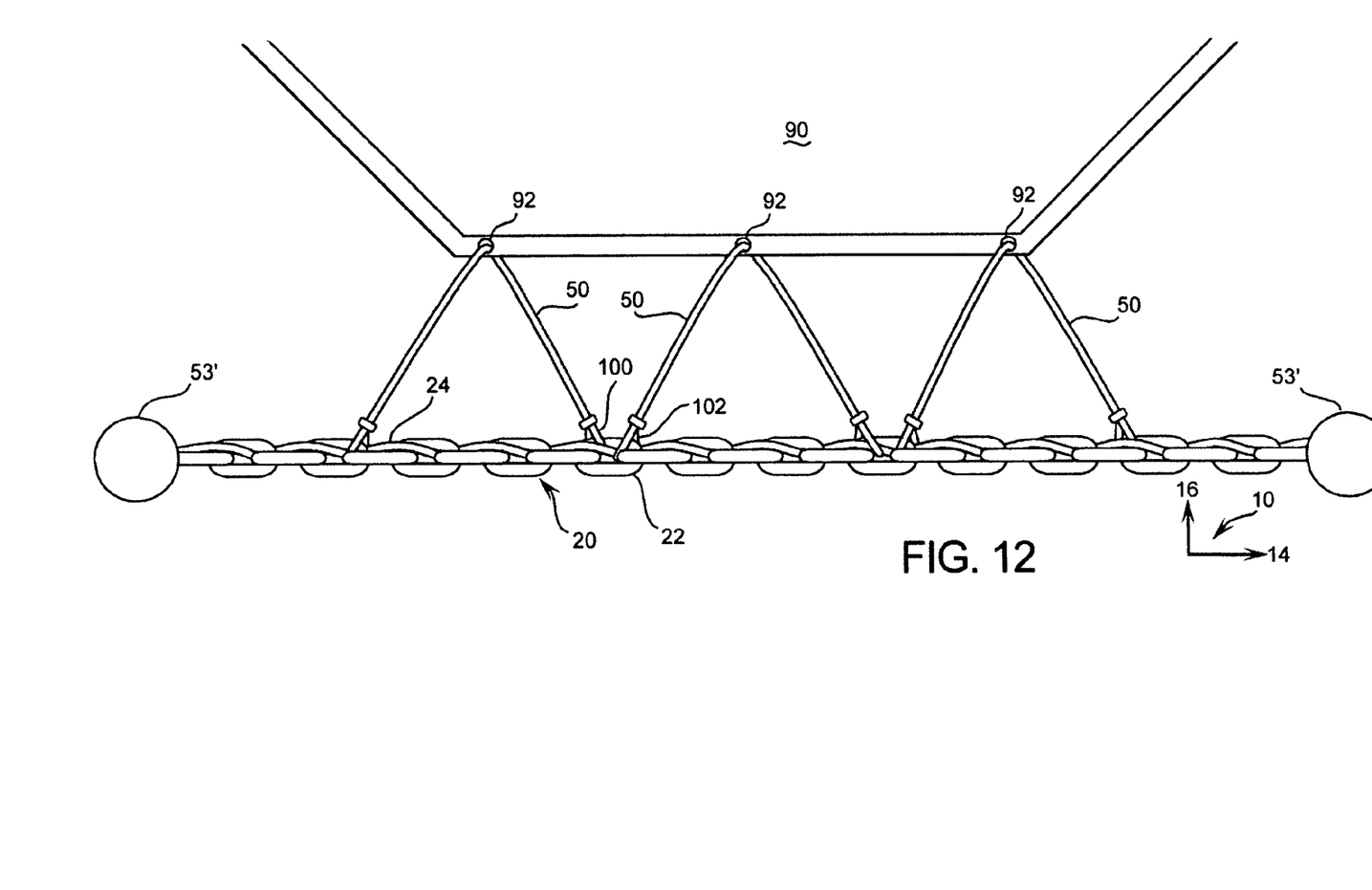
FIG. 12 is an environmental view wherein the chain assembly provides and secures an attachment for a tarp.

In one form, a fastener member 41 can be applied, such as a zip tie, key ring (plastic or metal), wire tie, or another type of circumferential frictional member. The purpose of this fastener 41 is to bind the cord member 24 to one of the chain members. The reason for such a fastener is that in an embodiment similar to that shown in FIG. 2, the frictional forces between the cord member and the outer surface of the chain may be lower than another embodiment, as shown in FIG. 12 and described further herein. Therefore, some sort of attachment member or adhesive fastening system which in one form is the member 41 can be employed at various locations, perhaps every two rungs or every three feet, and ranges therebetween. Further, the cord member 24 can become loose in various embodiments. The fastener, as shown in FIG. 2, is employed to keep the respective lengths between the cord member and the link members at a relative of orientation with one another to property function. In other forms, the cord member 24 may deliberately slide with respect to the chain members and reposition such that the cord member can be repositioned outwardly and rotated to form a half hitch type of connection to connect a cylindrical-type member. The fastener, which in one form can be a zip tie member, could perhaps be a flat headed zip tie or other type of cinching mechanism.

The chain assembly in one form may also be comprised of a unitary structure wherein the flexible cord member is integral to the chain links.

Figure 10:
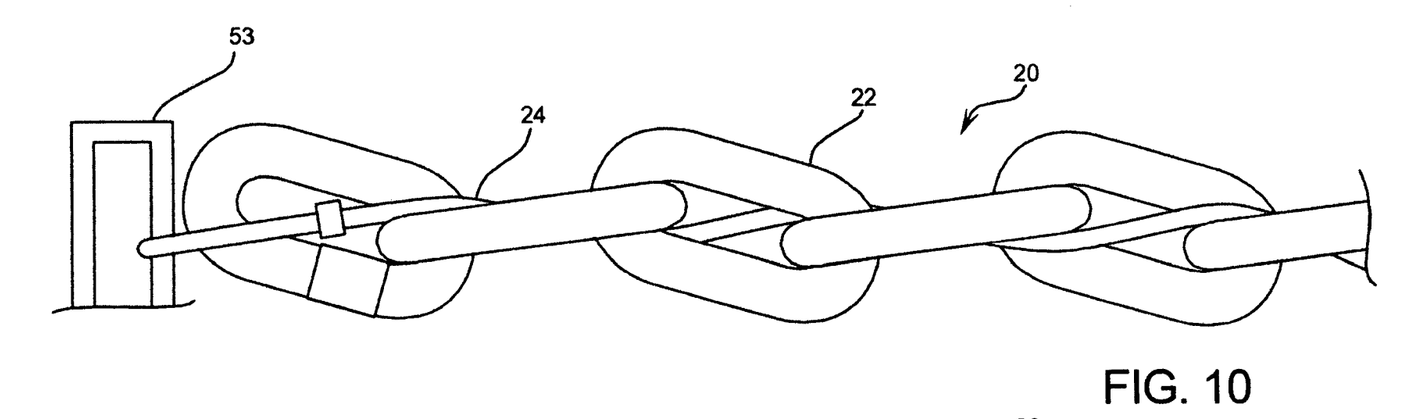
FIG. 10 is a side view of the disclosure including an attachment member and a crimp member wherein the cord member has been tensioned.
Figure 11:
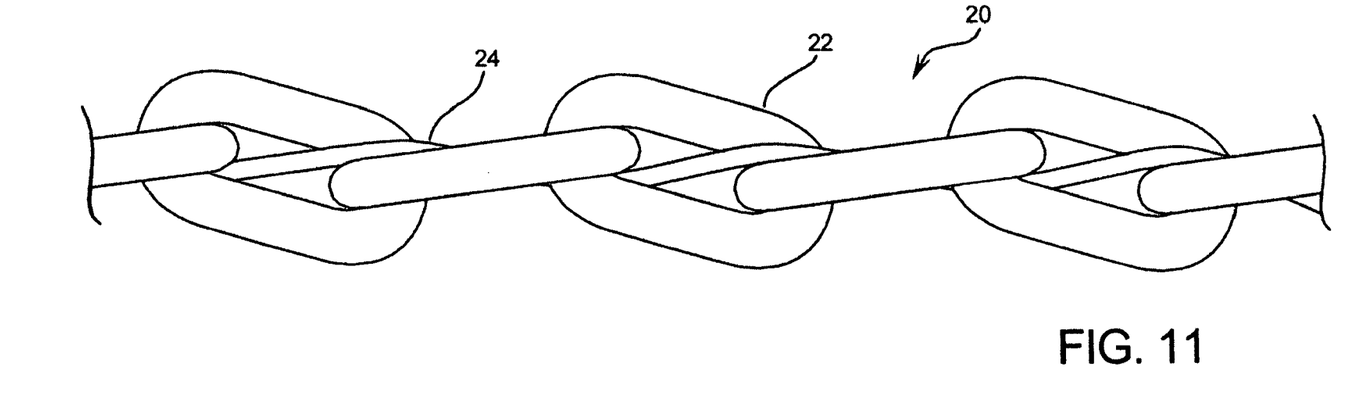
FIG. 11 is a side view of the disclosure wherein the cord member has been tensioned.

Shown in FIG. 10 and FIG. 11 is a possible embodiment of the disclosure, where a cord member 24 is tensioned. The orientation of the chain portion 22 will be aligned as shown. This does not interfere with the operation of the apparatus 20, but is shown for understanding and could result is easier attachment of connecting members 50. The connecting members 50 could be ropes, bungee, cables, rods, boards, or any other connecting members.

Figures 4, 5:
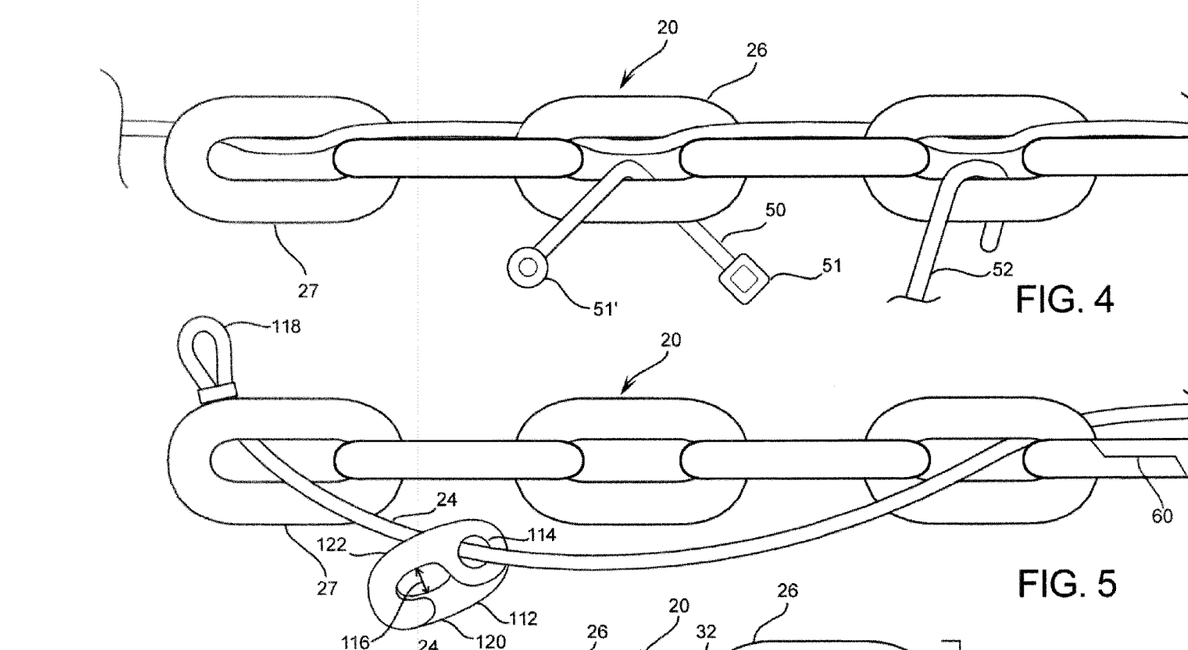
FIG. 4 is a view of several connective members.
FIG. 5 is a side view of embodiment showing a split-link connective member.

Once the assembly 20 is constructed, the assembly can be used for any number of purposes. Looking at FIG. 4, it can be seen how a connecting member 50 could be connected to a link 23 of the apparatus 20, thus receiving the benefit of the strength of the cord member 24, and the benefit of the position stability of the chain portion 22 in that any element connected through the link will not accidentally reposition along the length of the assembly 20. Alternatively, a hook 52 could be utilized, as often found on the end of bungee cords, strapping mechanisms, or coat hangers in the same manner. It is conceived that the securing member whether it be a bungee, cord, or hook-like member could couple to the chain utilizing a portion of the chain as a load-bearing member (as shown at 100 of FIG. 12), or alternatively could couple to the apparatus 20 around the cord member 24 such that the chain portion 22 would not be a load-bearing member but would act to maintain in the longitudinal position of the securing member along the apparatus 20 (as shown at 102 of FIG. 12).

Figure 13:
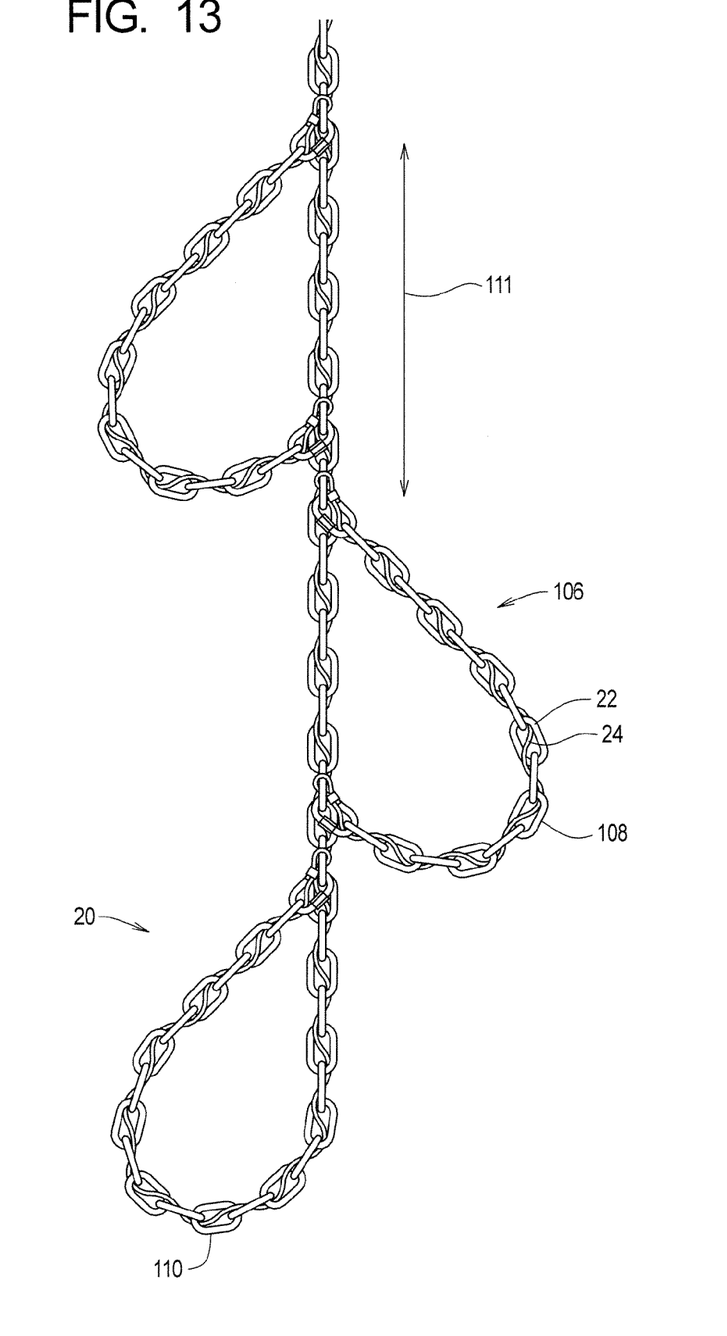
FIG. 13 is a side view of an embodiment of the disclosure forming a ladder-like apparatus.

In one form as shown in FIG. 13, the chain assembly 20 may further include loops 108 on alternate sides of the assembly 20 generally forming rungs 110 of a ladder-like apparatus 106. The cord member 24 adds rigidity to the assembly, while the chain member 22 substantially prevents the assembly from rotating and provides a more stable location for supporting a user's weight without slipping. In one form, the rungs 110 are substantially 14 inches apart on alternate sides of the main assembly 20.

It should be noted that this embodiment as shown in FIG. 3 provides greater friction where there is a more circuitous path of the cord member 24. Therefore, this embodiment has one advantage in that the cord member 24a is substantially within an outer circumference cylindrical surface defined by the outer dimension, seen at 93 in FIGS. 6 and 93a in FIG. 3. This, in one form, protects the outer surface of the interior cord member 24a. Further, as noted above, the circuitous path provides a greater frictional engagement between the two structures.

In one form, as shown in the various figures, the cord member 24 can have an outer coating, which in one form is generally a plastic-type coating around the metallic woven interior portion, made of the same material as the links. Any quick links, hooks, or other fasteners make likewise be coated for identification, or to protect objects near the assembly. Coatings or materials may also be used to provide weather resistance to the assembly. A think like such as the line commonly found in grass cutting tools may also be utilized. This thin plastic line may be utilized to keep the assembly 20 from bunching up and collapsing. Further, in one form, the member 24 can be integrally formed with the link member 22 there is an assembly of links a chain portion 22 to integrally form each member so both members operate as a single unit. For example, in one form, even the outer contours of the weaving can be formed right into the outer surface of the plurality of links of the chain portion 22.

As shown in FIG. 12, a tarp 90 includes a plurality of grommets 92. A chain assembly 20 is provided coupled at each end to a stable element 53'. A plurality of connecting members 50 are provided which couple at one end to the chain assembly 20, pass through the grommets 92, and return to the chain assembly 20. The connecting members 50 can be tied, hooked, or crimped at a plurality of locations along the chain assembly 20. They may alternatively couple at a first end to the tarp 90, or the stable element 53', and then passed between the chain assembly 20 and the grommets 92 multiple times to terminate at a stable location. This embodiment will stabilize the connecting members 50 along the chain assembly 22 limited in the lateral repositioning. As can be seen at points 100 and 102, lateral motion of the connecting members 50 along the chain assembly 20 is substantially prohibited by the chain-link 22.

The assembly 20 of one embodiment could also be very beneficial to those wishing to secure an animal to a general location. A cord member formed of a hard material such as for example steel when used alone could possibly injure an animal should the animal attempt to chew its way through the cord member, thus damaging its mouth or teeth. A load-bearing flexible cord member 24 woven through the lightweight malleable chain 22 would protect the animal, as the animal's mouth and teeth would encounter the malleable chain, rather than the cord member. While many substances can be used to form the links of this embodiment, such as a polymer, plastic chain is a very common product and could have additional cost-saving benefits. This embodiment also has the benefit of structurally protecting the flexible cord member 24 from an animal's teeth and claws, or other damage.

A hook 112 maybe utilized to form one end of the assembly 20 into a chocker-style assembly. For example, the cord member 24 may be passed through the eye 114 of a hook 112, which is configured to be permitted to slide along a length of the cord member 24. The gap 116 of the hook 112 is then coupled to an eye 118 formed in the end of the cord member 24, or alternatively onto one of the chain link members. A sister style hook may also be utilized to further secure the cord member wherein a first 120 and second 122 hook are adapted to rotate about the eye 114 to open the gap 116 and allow passage of the eye 114. Then the first 120 and second 122 hooks are rotated to a closed position (as shown) wherein they retain the eye 114 within the gap 116. Thus any longitudinal force will tend to close the loop formed by the hook 112, tightening around any element within the loop.

Another embodiment is disclosed where in at least one of the chain link elements is a link known as a split link 60 (see FIG. 5) which allows the link to be positioned around a closed circle element, and then closed to secure said close circle element to the remainder of the chain 22. Such split links are common and thus a detailed description of their use is omitted.

Figure 8:
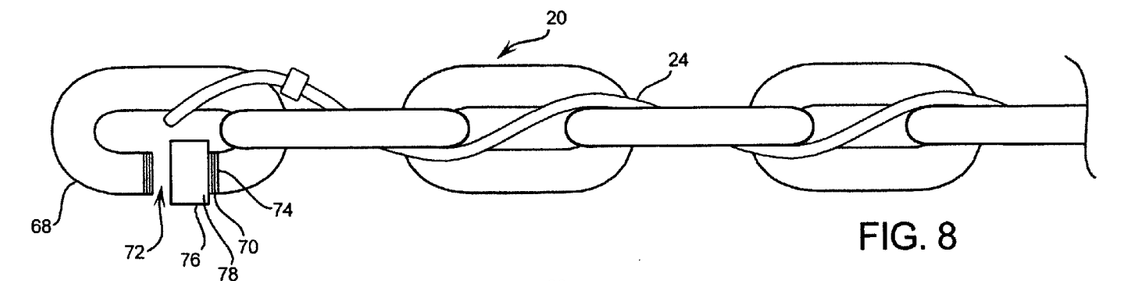
FIG. 8 is a side view of an embodiment of the disclosure including an open link.
Figure 9:
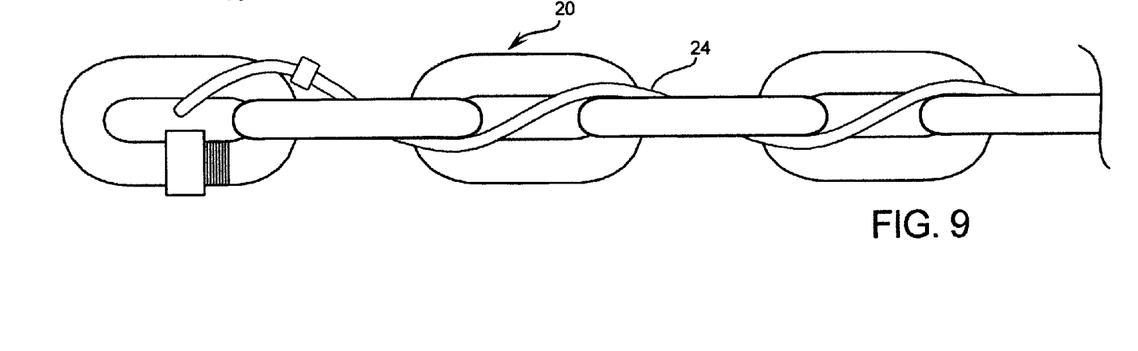
FIG. 9 is a side view of an embodiment of the disclosure including a closed link.

Another embodiment is disclosed in FIG. 8 wherein at least one of the chain link elements is a quick-link 68 having a receiving area 74, and a nut 78 positioned about the receiving area 74 which can be then be re-positioned, opening the gap 72. A threaded portion 70 of the quick-link 68 is provided such that the nut 78 can be secured in a position bridging the gap 72. This operation closes the quick-link 68 to secure an element to the remainder of the chain 22. This is further facilitated by an optional surface 76 configured to increase friction between a users fingers and the nut 78, or optionally between a tool, such as a pair of pliers, or an open-ended wrench and the nut 78.

A crimp 80 could also be provided in one embodiment of the disclosure to secure the assembly 20 to a stable element 53 (see FIG. 10), or alternatively, a link 22. This is accomplished as shown in FIGS. 7-10 by passing the cord member 88 through the crimp 80, forming a loop 86, and then returning back into or through crimp 80. This forms a convenient loop 86 to couple to. It is also possible to secure the apparatus 20 to a stable element 53 by passing the cord member 88 through the crimp 80, exiting the crimp 80 as first strand 82, passing the first-round 82 around a portion of a link 22, reentering the crimp 80 as second strand 84, and securing the crimp 80. This embodiment would secure the apparatus 20 to the stable link 22, to a terminal link 27, or a stable element 53.

In another embodiment, the apparatus described above can be utilized to partially enclose the rear opening of a truck bed, replacing what is commonly known as a tailgate. Whereas a solid unit tailgate significantly disrupts the flow of air through the truck bed as the vehicle progresses at speed, options which allow more airflow, and thus reduce drag and increase fuel efficiency are desired. By creating an apparatus 20 as described above, and coupling it to either side of the rear opening of a truck, large items would be secured from exiting the rear of the truck and airflow would not be significantly reduced.

In an alternative embodiment, the device 20 is used as a tool retaining device. As such, the device 20 is suspended by a plurality of securing members 51 and tools are inserted through the surfaces defining voids 31 in the chain portion, or alternatively between the apparatus 20 and a workshop surface such as a wall, or alternatively between the chain portion 22 and the cord portion 24.

In one embodiment, the chain links 22 have a length 91 of 2 1/16", a width 93 of 1 3/32', a thickness 96 of 9/32", a shot diameter 98 of 5/16", and the central void area has a width 94 of 7/16". Possible cord member diameters 99 are 1/8" or 5/32" to 3/16", ±20%.

Figure 14:
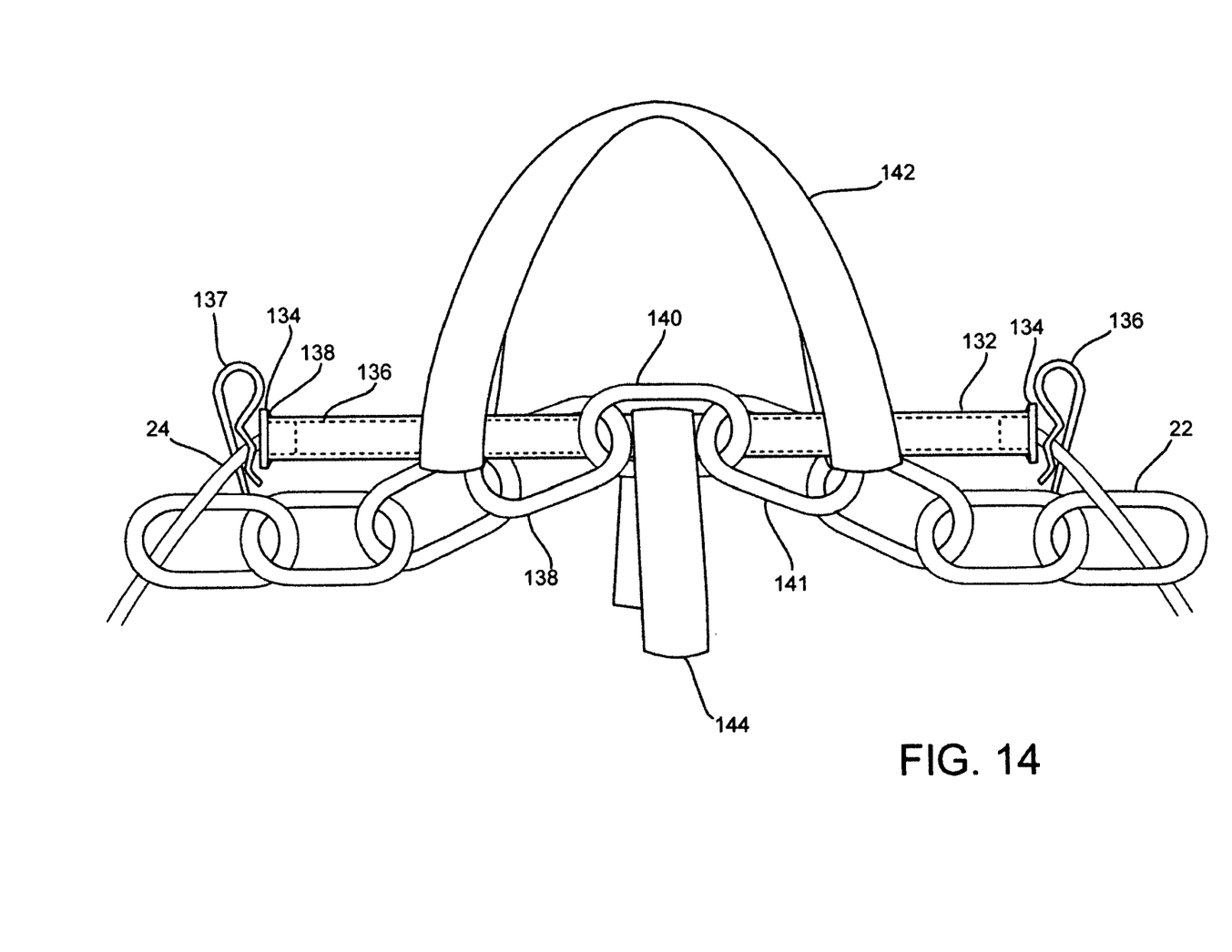
FIG. 14 is a side view of an embodiment of the disclosure configured to attach to a plurality of straps.
Figure 15:
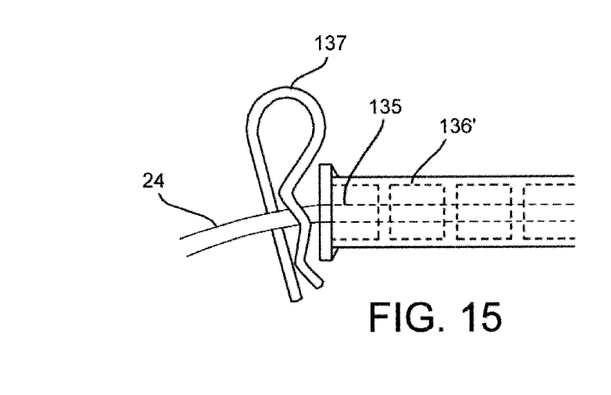
FIG. 15 is a detailed view of a portion of FIG. 13.

Another embodiment, shown in FIG. 14 shows a tube 132 having a plurality of end caps 134 disposed on either end of the tube 132. In one embodiment an spacer 136 may be provided. The cord member 24 passes through the end caps 134 and through the spacer 136 which, as previously mentioned, may be disposed within the tube 132. A plurality of clips 137 for retaining the cord member 24 may also be provided to limit the transverse motion of the cord member 24 in relation to the tube 132. The end caps 134 may be provided with a flange 138 which limits the transverse motion of the flange of the end cap 134 in relation to the tube 132. In one form, the chain 22 is arranged such that the tube 132 and those elements within the tube 132 passes through a first ring 138 adjacent to a second ring 140 and through a third ring 141. As can be seen, the remainder of the apparatus can be arranged similarly to any of the previously discussed embodiments. In this way the tube 132 provides a secure anchor point for a strap 142 or loop and alternately (or additionally) a strap 144. Either one of the straps 142 or 144 may be replaced by a flexible cord member, cable, or other elements. By using a different orientation of the second ring 140 or possibly utilizing more than one ring parallel to the tube 132 as shown in the second ring 140 a much wider strap 144 may be utilized. As shown in FIG. 15, the spacer 136 may be formed of a plurality of spacers 136'.

Now looking at FIG. 15, the interior spacer 136 as shown in FIG. 13 is comprised of a plurality of interior spacers 136'. These interior spacers 136 or 136' operate to reduce the motion of the cord number 24 within the tube 132. Alternatively, the tube 132 can be provided such that the longitudinal hole 135 is only slightly larger than the flexible cord member 24 thus reducing the motion and thereby reducing wear and tear on the cord member 24 as well as the tube 132.

Figure 16:
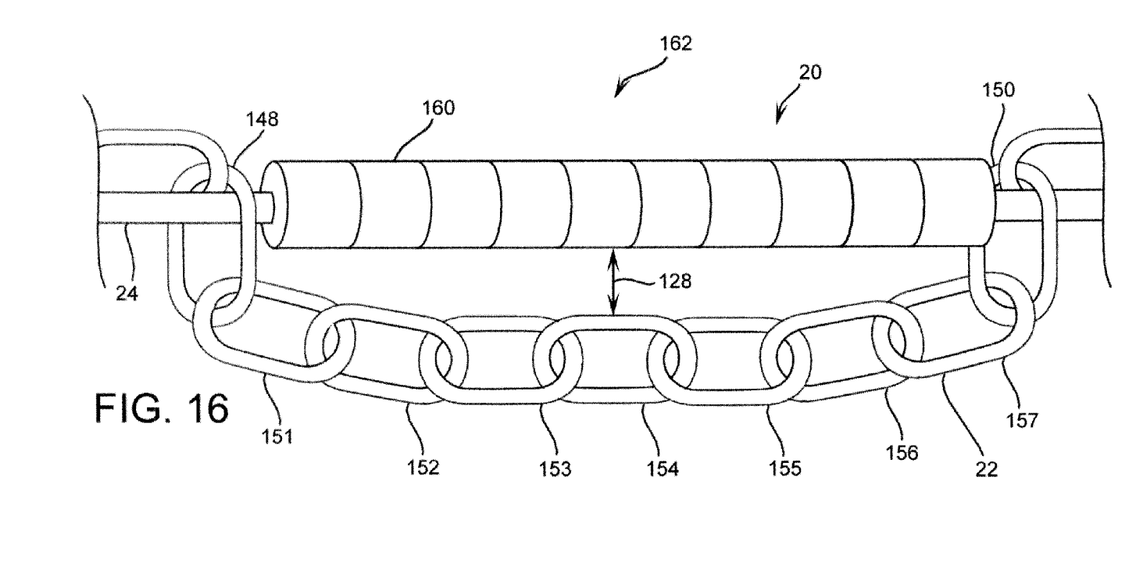
FIG. 16 is a side view of an embodiment configured to form a handle or securing member utilizing a plurality of spacers.

Another embodiment, as shown in the FIG. 16, provides a plurality of spacers 160 disposed upon the cord member 24 between a first chain member 148 and a ninth chain member 150. The chain member 22 is configured around the cord member 24 at the first chain member 148 and also around the ninth chain member 150. The second through eighth chain members referenced 151-157 are disposed substantially parallel to the cord member 24 and the spacers 160. This provides a gap 128 which provides an easy handle or connection point for the for the assembly 20. A user may grasp the handle portion 162 defined by the spacers 160 which forms a convenient and comfortable handle. Alternatively, the handle portion 162 may be covered by a flexible member such as a section of hose or fabric.

The retaining clip 137 may be one of many retaining clips known in the art. FIG. 18 shows one prior art example of a retaining clip 137. This retaining clip has a loop portion 164, a straight portion 166, a gap 168, and in opening 170. The opening 170 is generally at the engaging end 172. Opposite the straight portion 166 is a W-shaped portion 174 which provides only the opening 170 but also the gap 168. The gap 168 is configured such that a cord member 24 as shown in FIG. 17 is secured therewith and is substantially hindered from repositioning along the straight portion 166, or being removed from the retaining clip 137 via the opening 170.

Figure 17:
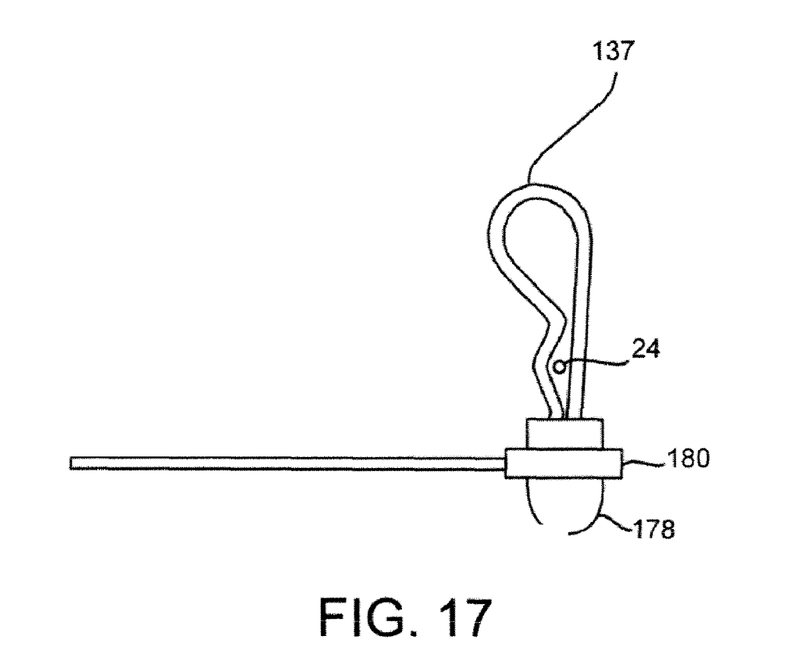
FIG. 17 is an environmental view of an embodiment of the disclosure including a retaining pin and protection/securing elements.
Figure 18:
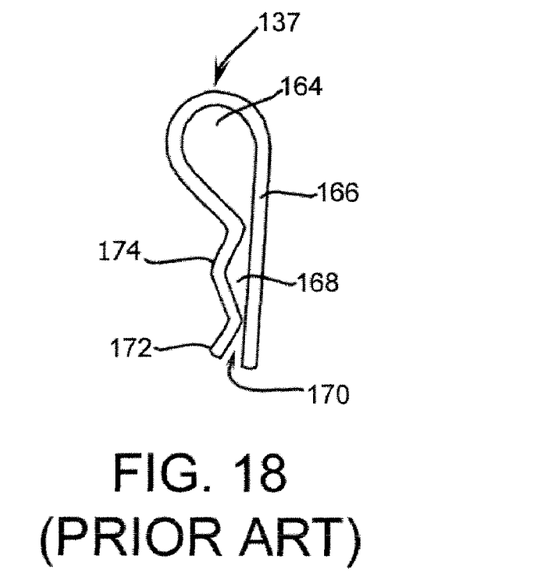
FIG. 18 is a view of a prior art retaining pin.

FIG. 17 shows the retaining clip 137 having a cap 178 fitted around the opening 170. The cap 178 accomplishes the several advantages; the first advantage is that the engaging end 172 may have a sharp or substantially pointed portion which could scratch or damage softer objects or materials it encounters such as a person, furniture, or a vehicle. Furthermore the cord member 24, while substantially secured by way of the dough U-shaped portion 174 is further secured a utilizing the cap 178. A tie 180 such as a wire or tie or zip tie (commonly known in the art) can be utilized to further secure the cap 178 to the engaging end 172 of the retaining clip 137.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. An attachment assembly comprising:
   a. a plurality of link members, each having an outer perimeter, and an inner surface defining a void interconnected such that the body of one link member passes through the inner surface defining a void of another link member,
   b. the alternating link members described as being alternately oriented in a first or second orientation such that the first oriented link members have a left side and a right side, the second oriented link members have a top side and a bottom side;
   c. a load-bearing flexible cord member coupled to the plurality of link members such that a portion of the cord member passes through the inner surface defining a void of at least one of the link members
   d. wherein the load-bearing flexible cord member has a first and second attachment location attached to a first and second external attachment location, and
   e. wherein the link members are provided for connection to a first connecting strap.

2. The assembly of claim 1, wherein the load-bearing flexible cord member passes from the right side to the left side of the first oriented link members through the inner surface defining a void of each first oriented link member and does not pass through the surface defining a void of the second oriented link members.

3. The assembly of claim 1, wherein the load-bearing flexible cord member passes from the top side to the bottom side of every other second oriented link member, and passes from the bottom side to the top side of the alternate second oriented sink members through the inner surface defining a void of each second oriented link member and does not pass through the surface defining a void of the first oriented link members.

4. The assembly of claim 1, wherein the load-bearing flexible cord member passes from the right side to the left side of every other first oriented link member, passes from the left side to the right side of the alternate first oriented link members, passes from the top side to the bottom side of every other second oriented link member, and passes from the top side to the bottom side of the alternate second oriented link members through the inner surface defining a void of each second oriented link member.

5. The assembly of claim 1 wherein the flexible cord member is comprised of a metal cable.

6. The assembly of claim 5 wherein the metal cable is at least partially covered by a protective polymer coating.

7. The assembly of claim 6 wherein the protective polymer coating is comprised of the same material as the material comprising the link members.

8. The assembly of claim 1 wherein there is sufficient friction between the load-bearing flexible cord member and a link member connected to the connecting strap to inhibit lateral motion of the connection point.

9. The assembly of claim 1 further comprising a hook wherein the cord member passes through the eye of a hook and the hook is operatively configured to slide along a portion of the cord member.

10. The assembly of claim 1 wherein at least one of the cord member or the link members are formed of a biodegradable material.

11. A method for securing items comprising the steps of:
    a. providing a chain and flexible load-bearing cord member combination wherein the flexible cord member passes through a plurality of links of the chain wherein a load-bearing maximum tension stress of the flexible cord is greater than that of the chain,
    b. coupling a first end of a securing coupler to at least one link of the chain, and
    c. coupling a second end of the securing coupler to a secure element.

12. The method for securing items of claim 11 wherein the securing coupler is selected from a list consisting of bungee cords, ropes, hooks, and straps.

13. The method for securing items of claim 11 wherein the chain is comprised of a polymer chain link element.

14. The method for securing items of claim 13 wherein the cord member is a polymer coated cable and the polymer coating is comprised of the same material as the chain-link element.

15. A chain assembly comprising:
    a. a plurality of link members, each having an outer perimeter, and an inner surface defining a void interconnected such that the body of one link member passes through the inner surface defining a void of another link member,
    b. the alternating link members described as being alternately oriented in a first or second orientation such that the first oriented link members have a left side and a right side, the second oriented link members have a top side and a bottom side;
    c. a load-bearing flexible cord member coupled to the plurality of link members such that a portion of the cord member passes through the inner surface defining a void of at least one of the link members;
    d. a rigid tube which passes through a plurality of chain-link members wherein the flexible cord member passes through the tube.

16. The assembly of claim 15 further comprising a strap coupled to the tube and configured to form a secure anchor point.

17. The assembly of claim 15 further comprising a plurality of spacer members disposed within the tube to secure the cord member from abrasion.

18. The assembly of claim 15 further comprising a plurality of retaining clips to maintain the longitudinal orientation of the cord member in relation to the tube.

19. The assembly as recited in claim 18 further comprising;
    a. a malleable cap adaptively configured to be fitted over a portion of at least one of the retaining clips; and
    b. a tie member adaptively configured to secure the cap portion to the retaining clip.

20. An assembly comprising a cord member passing through a first chain member and a second chain member
    a. wherein a plurality of chain members are disposed substantially parallel to the cord member coupling to the first chain member at a first end and to the second chain member at a second end;
    b. further comprising a plurality of spacers disposed upon the cord member to provide a larger diameter connection point or handle for the assembly, and;
    c. wherein the chain members are positioned external of the spacers.

21. The assembly of claim 20 wherein the spacer members are substantially cylindrical.

22. An assembly comprising:
    a. at least on retaining clip having a loop portion, a straight portion, and an engaging end;
    b. a malleable cap adaptively configured to be fitted over the engaging end of the at least one retaining clip; and
    c. a tie member adaptively configured to secure the cap portion to the retaining clip.

23. An attachment assembly comprising:
    a. a plurality of plastic link members, each having an outer perimeter, and an inner surface defining a void interconnected such that the body of one link member passes through the inner surface defining a void of another link member, b. the alternating link members described as being alternately oriented in a first or second orientation such that the first oriented link members have a left side and a right side, the second oriented link members have a top side and a bottom side;

c. a load-bearing flexible cord member coupled to the plurality of link members such that a portion of the cord member passes through the inner surface defining a void of at least one of the link members; and d. wherein the link members are provided for connection to a first connecting member.

* * * * *